Sept. 5, 1961         R. E. FEARON         2,999,162
APPARATUS FOR LEAK TESTING
Filed Sept. 22, 1958                                  3 Sheets-Sheet 1

Sept. 5, 1961    R. E. FEARON    2,999,162
APPARATUS FOR LEAK TESTING
Filed Sept. 22, 1958    3 Sheets-Sheet 2

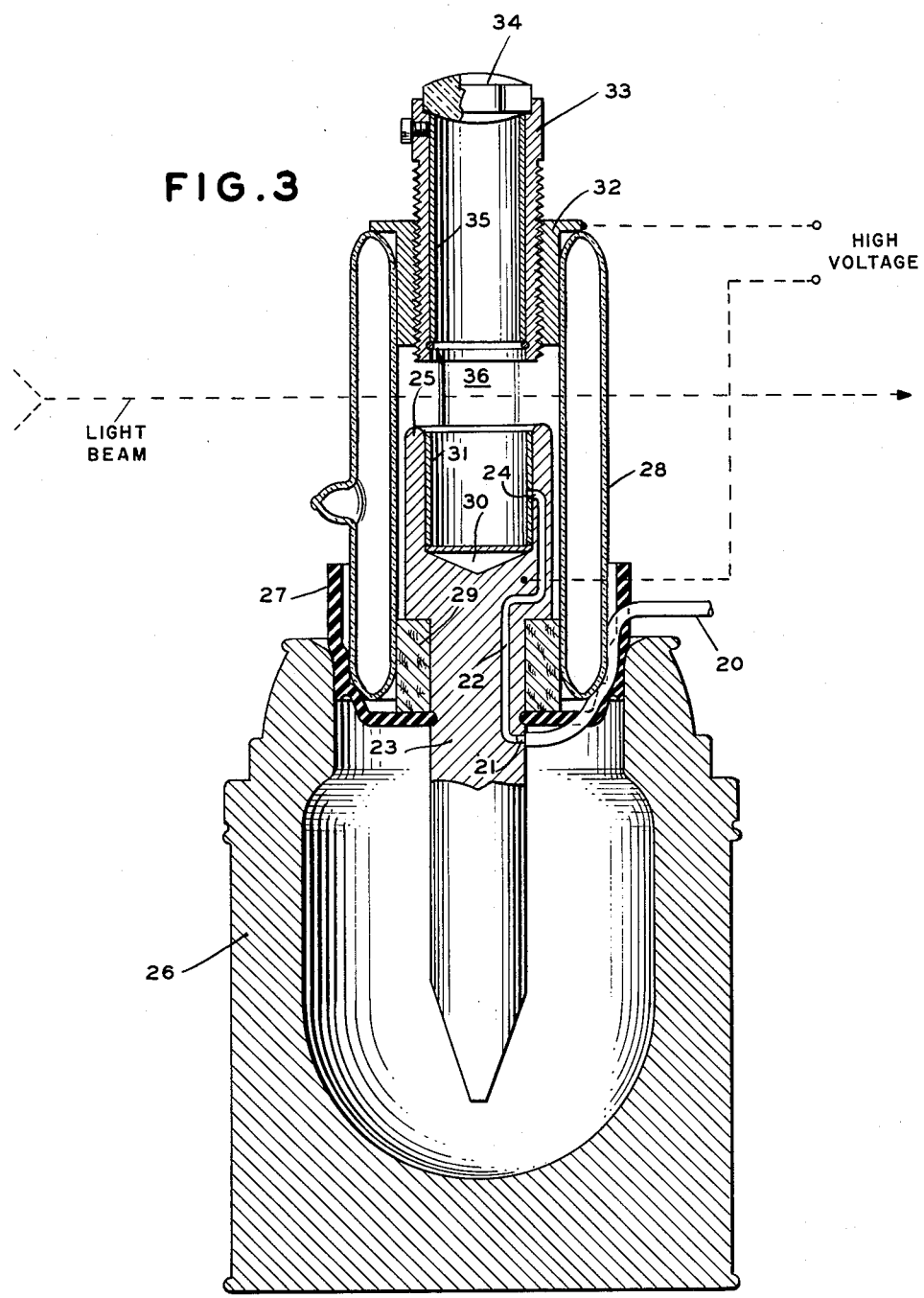

United States Patent Office 2,999,162
Patented Sept. 5, 1961

2,999,162
APPARATUS FOR LEAK TESTING
Robert E. Fearon, Tulsa, Okla., assignor to Electro Chemical Laboratories Corporation, Tulsa, Okla., a corporation of Delaware
Filed Sept. 22, 1958, Ser. No. 762,617
6 Claims. (Cl. 250—83.6)

The present invention relates to leakage testing, and more particularly to a method and apparatus for testing for leaks in closed vessels.

In the art of leakage testing there are a number of well known methods, all of which have certain disadvantages and inconveniences, as will become apparent. One such method, for example, consists in filling the vessel to be tested with a compressed atmosphere containing a quantity of some highly odorous substance such as hydrogen sulfide. The escape of any of the contaminataed atmosphere is very sensitively detected in view of the low threshold of odor of the human nose for hydrogen sulfide. Thus a very small leak can be detected by this means, and, additionally, leaks can be localized if the inspection is done by a person who has skill in the art of using his sense of smell. Disadvantages of this method are lack of cultivation of the sense of smell among the general public and the fact that it is a problem to superimpose any scientific controls with which to verify a result obtained by the use of the sense of smell. Additionally, there is the fact that hydrogen sulfide overloads or paralyzes the smell when it comes at concentrations outside the range of one in ten million to about five parts per million. Moreover, if a sufficiently strong concentration is used to achieve maximum sensitivity in a test of this kind, there is danger to the person using his nose to detect the leak, since hydrogen sulfide at one thousand parts per million will cause immediate death, even if only one inhalation of such an atmosphere has occurred. Also, $H_2S$ corrodes many materials, restricting its use.

Other highy odorous gases such as vapor of an alkyl isothiocyanate are also exceedingly undesirable and moreover, in the case of the last named substance (which occurs in raw onions), the vapor pressure is quite limited, thus restricting the concentration of the atmosphere which may be used for test purposes. Powerfully sensitive materials such as pyridine and the lutidines are more or less subject to the same difficulty, as is thiocarbonic acid. Very definitely strongly odorous materials, such as arsine or the gaseous hydrides of selenium or tellurium, would not be preferred because of the exceedingly poisonous and malignant nature of these substances in respect of their biological influence.

Another method of testing leaks, used in refrigeration systems, consists in operating a Bunsen burner or equivalent in such a manner that the input air is delivered not through a mere open hole at the base of the burner, but instead is received through a tubular connection which can be put in close vicinity where a leak is expected. Chlorinated or fluorinated hydrocarbons may be used for test gases. A positive test shows indication of the presence of a leak whenever a distinctive green color of the flame appears. The green color is caused by the influence of chlorinated or fluorinated hydrocarbons with the intake air used to supply the flame. The leak may be localized by examining various possible sources, successively placing the open end of the air input tube at the points where inspection is being made. This test is susceptible of good use in the refrigeration business, which requires only the detection of relatively gross leaks. It is particularly convenient since, as it happens, the most frequently used refrigeration gas, freon, is one of the class of substances which very sensitively imparts a green color to the flame. Therefore, the normal loading of the refrigeration system also serves as a test atmosphere to examine leakage.

Sundry other methods of testing leaks are also known and have been used from time to time. One of these which is very prevalent in the art of extremely sensitive leak detection is known as the helium leak detector. In operation, the helium leak detector functions to receive test atmosphere through a tube capable of being used for probing as described in the refrigeration testing arrangement. The helium leak detector may also be employed in another manner, in which the vessel to be tested is filled with an atmosphere containing helium and placed in an evacuated space. The evacuated space is then constantly pumped out by a pump such as the Welch Pressovac, which delivers its effluent to the helium testing means. To make sure that there is some delivery, a small amount of inert gas not containing helium is constantly added to the evacuated space through a suitable deliberate leak of such gas into the evacuated space. Such gas may be, for example, nitrogen. In the helium testing detector (illustrated by commercial systems presently marketed by Consolidated Engineering Corporation of Pasadena, California), the detecting means is a modified mass spectrograph of the kind originally invented by Lord Aston, but especially adapted to observe helium in a sensitive manner. The capillary arc ion source, which is commonly provided in all such equipment, is fed by the atmosphere delivered from the Pressovac pump previously mentioned. The magnetic and electrostatic deflecting means, which are always used in a mass spectrograph, are adjusted to direct the beam of electrically charged helium ions upon a collector target where they are sensitively measured by a suitable electrical amplifier. Detection is usually based on singly charged helium ions. Detection is very sensitive, for the reason that helium is relatively rare in nature and for the further reason that other ions are not measured, but in fact are stringently ignored in a system such as has been recited.

The helium testing detector, which is one of the most advanced leakage detection systems now commercially available, is used for very refined testing, including testing of vessels which must hold especially stringent vacua for very long periods. There are certain disadvantages in helium leak testing. One of these is the relatively rapid rate at which helium diffuses through sensibly continuous materials in which there are no holes at all, but only inter-atomic spaces of the kind which characterize uniform solid substances composing the walls of the vessel being tested. This defect of helium testing results in less refined ability to determine palpable leaks, and a higher threshold which such leaks must achieve to be distinguished from the background, for material arriving at the tester because of diffusion through the solid walls. Very thin walled vessels are not well tested by helium for this reason.

Another disadvantage of the helium testing detector comes about because of the prevalence of helium in small quantities in nature. While it is true that helium is not abundant in naturally occurring gases, it is also true that it is almost universally present in low concentrations. The air, for example, contains perceptible traces of helium. Again, helium is abundant in natural gas used for fuel purposes, ranging from a few parts per million to 1% or so. Naturally, helium will be present in tank nitrogen derived from common sources, since this gas is commercially obtained by the distillation of air. In fact, helium will be generally present in most gaseous atmospheres, unless some strong effort is made to insure its absence. The ubiquitous nature of this element, even at low concentration, represents a second disadvantage above and beyond its diffusibility, which was noted previously.

There have been various other methods of leakage testing proposed. Most of these are inferior in one way or another to helium leakage testing. For example, leakage testing by means of radon gas can be done by using an atmosphere containing radon in the vessel to be tested and employing sensitive radioactivity detecting means to observe the escape of radon from any leaks. Unfortunately, radon is a very expensive substance and, like helium, it is also a widely distributed material in nature. Furthermore, the presence of radon in a vessel that is being tested results after a while in there being a deposit of radioactive substance on the walls of the vessel which contained the radon. One of these substances so deposited is a radioactive isotope of lead (lead 210 or "radium D"). The aforementioned radio element has a half-life of 22 years and thus represents a substantially permanent contamination of the interior wall of any vessel which has been exposed to radon.

In the leak detecting method of this invention, there is used a substance much more rare in nature than either helium or radon, to wit, the radioactive isotope of hydrogen, tritium (hydrogen of atomic weight 3). The product of tritium is a stable substance being helium of atomic weight 3, which is not radioactive. Therefore, tritium does not contaminate the interior of any vessel which has been exposed to it. The radioactive properties of tritium, though corresponding only with very weak beta radiation, nevertheless are peculiarly adapted to indicate the presence of this substance for purposes of leak detection. As is well known in the art of radioactivity, the statistical significance of a measure of a certain number of nuclear events of a given kind depends merely on the total number of such events (provided they are detectable) and does not depend upon the kind of events involved. Thus it happens that the figure of merit of detectability in a radio element is the number of curies (or microcuries) present, provided the disintegrations can be detected reliably. Only a few rare cases such as argon 37 or iron 55, exhibiting extremely low energy radiations consequent to K electron capture, are exceptions to the general rule that radioactive disintegrations, of whatever kind, are detectable individually. It happens that as a consequence of the relatively low energy of the beta rays of tritium, this substance is biologically far more tolerable than, for example, radium or radon. The ratio of toxicity between tritium and radon has been variously estimated at a factor from one to several million for equal curie quantities. It happens further that the production of tritium by the bombardment of naturally occurring lithium in a chain reaction pile is a rather convenient and efficient process. One consequence of the convenience and efficiency of tritium production is its low market price at the present time of $2.00 a curie. A curie of tritium is approximately equal to the amount that would be naturally present in hydrogen derived from a billion long tons of water. It is therefore easily seen that overriding, for test purposes, the concentration of tritium present in nature presents no difficulty. This conclusion is even more valid if the comparison were made with reference to hydrogen derived from fossil water which can be had by pumping from various levels of brine confronting any of the many borings in the earth which have been made for the production of petroleum. In fact, fossil waters are produced in enormous quantities, are wasted, and, further, the disposal of such fossil waters generally presents a problem. Therefore it is a matter of utmost ease and facility to obtain, from such water, hydrogen which contains no measurable amount of tritium.

In addition to being biologically less offensive than other radio-elements and being adapted to leave vessels which contained it largely uncontaminated, and in addition to the further fact that substances readily available in nature are almost absolutely devoid of tritium, it has other desirable characteristics which qualify it exceptionally well as a medium for sensitive leak testing. Thus its beta ray emissions have no associated gamma radiation. Accordingly, there is no need to shield equipment intended for the detection of tritium from any radiation which might otherwise enter through the walls of the testing instrument from the vessel being tested. Only when tritium itself is materially transported and enters the inside of a testing instrument does it cause observable effects. Beyond the above advantage, tritium also has a distinctly low energy and therefore can be recognized and differentiated from other radiation sources when it is present in the interior of a testing instrument. Such a distinction may be made in a cloud chamber by recognizing the character of the distinctive tracks which appear in response to the presence of this substance. Besides, tritium may be readily tested for in a flow counter system especially arranged for internal counting of tritium containing atmospheres. Such a counter system is described in my copending application Serial No. 545,335, filed November 7, 1955, now Patent No. 2,886,713.

Other instruments may be used for testing for the presence of tritium, particularly desirable devices being cloud chambers of the type described in my copending applications Serial Nos. 724,743 and now abandoned 734,639, filed March 28, 1958, and May 12, 1958, respectively, and the Geiger counter system described in my copending application Serial No. 545,335, filed November 7, 1955.

Another advantage provided by the leak detector system of the invention is the much lower diffusion rate of tritium through solid walls as compared with helium. The difference is of the order of a thousand fold in favor of tritium, when the walls are composed of glass.

The principal object of the present invention has been the provision of a novel and improved method and apparatus for locating leaks in closed vessels.

More particularly, it has been an object of the invention to provide a novel and improved method and apparatus for testing and locating small leakages in vessels which are required to be gas-tight.

Another object of the invention has been the provision of a novel and improved leak testing system in which tritium gas is used as a test substance.

A further object of the invention has been the provision of a novel and improved method and apparatus for radioactive assay of the leakage effluent from a vessel being tested.

A feature of the invention has been the provision of a novel and improved method and apparatus for leak testing which can be used for testing very thin walled vessels of relatively large exterior area.

Other and further objects, features and advantages of the invention will be apparent from the following description.

The method in accordance with the invention involves the steps of filling a closed vessel to be tested with an atmosphere containing an appreciable quantity of tritium gas at a pressure substantially in excess of the pressure in the space surrounding the vessel. Atmosphere is withdrawn from the space surrounding the vessel and tested for the presence of tritium gas by observing tritium disintegrations.

The apparatus of the invention comprises a pump having its inlet communicating with the space surrounding the tritium gas filled vessel, a detecting device for detecting low energy nuclear radiations from a gaseous sample, and means interconnecting the detecting device and the pump outlet whereby tritium gas leaking from the vessel will be delivered to the detecting device.

The invention will now be described in greater detail with reference to the appended drawings, in which:

FIG. 3 is a longitudinal sectional view of a diffusion cloud chamber for use in the system of the invention.

Figure 1A:
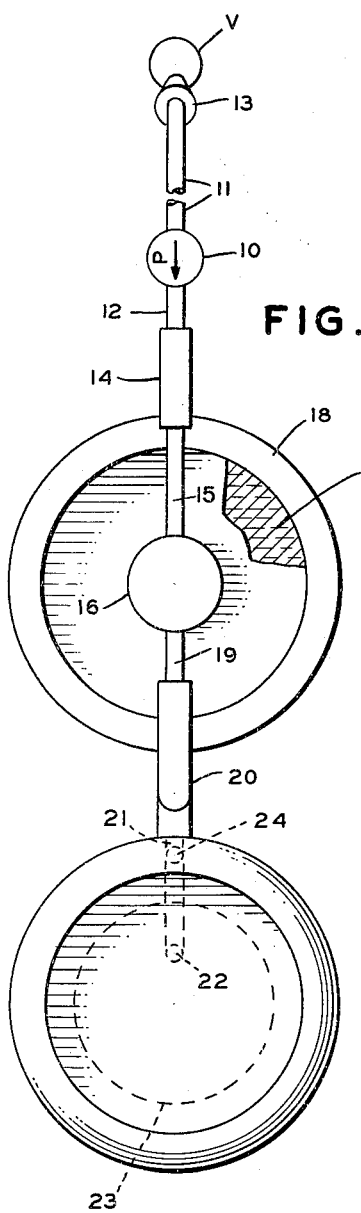
FIG. 1A is a side elevational view of the system of FIG. 1.
Figure 1:
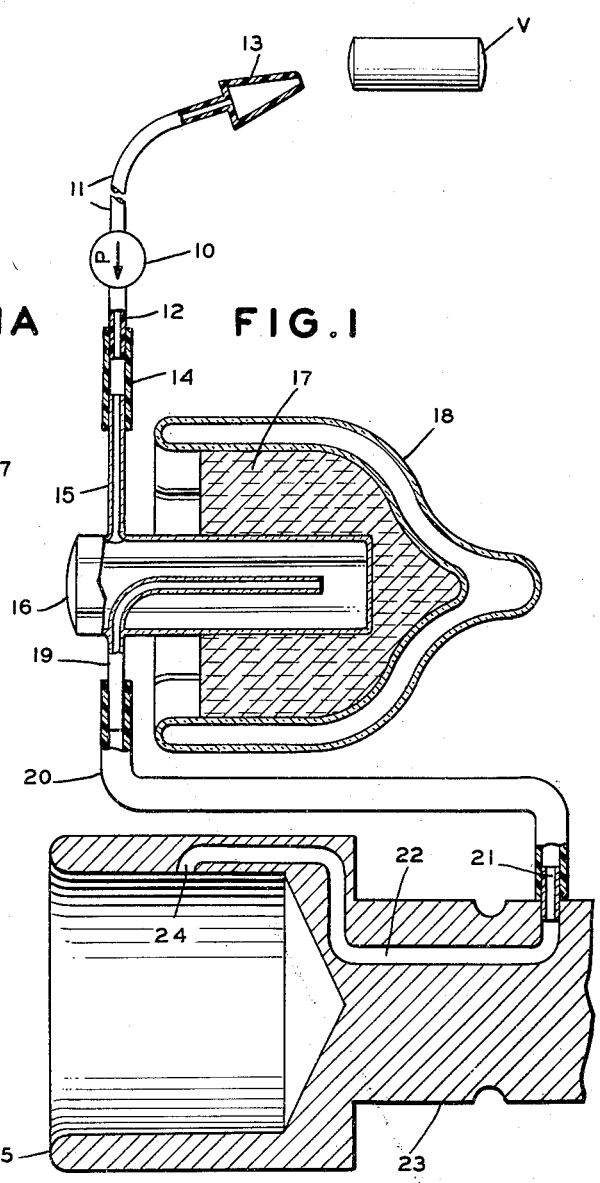
FIG. 1 is a longitudinal sectional view, largely diagrammatic, of a leakage detection system in accordance with the invention.

Referring now to the drawings, and more particularly to FIGS. 1 and 1A, there is provided a pump 10 having an inlet 11 and an outlet 12. The pump 10 may be of any suitable type but should have as small a volume as possible consonant with the required capacity. One suitable pump of a commercially available type operates on the basis of successive squeezing of longitudinally spaced portions of a piece of flexible tubing. Another suitable pump which is especially adapted for manual operation is of the type used in certain medical instruments and which involves a small squeezable bulb with a valve at each end of the bulb. With a manual pump of this type, pump operation can easily be coordinated with observation in the optical system.

The pump input 11, which may be a flexible tube, extends to the space surrounding the vessel to be tested shown diagrammatically at V. If this space itself is enclosed, atmosphere therein contained will be drawn into the pump. If the space is not enclosed, samples of the atmosphere at various points adjacent the surface of the vessel being tested may be withdrawn by action of the pump 10, preferably through a pointed nozzle 13 located at the end of the pump inlet tube 11. In some cases it will be desirable to sweep over the entire surface of the vessel being tested, while in others it will only be necessary to collect samples from adjacent those areas where leaks are likely to be present.

The vessel V should be filled with an atmosphere containing an appreciable quantity of tritium gas. The other gas or gases mixed with the tritium should not be liquefiable at the temperatures and pressures subsequently used in the system. The pressure within the vessel V should be higher than that in the surrounding space and preferably is substantially higher so as to cause a loss of tritium gas through any leaks that may be present. For thin walled vessels, care should be taken that the pressure differential does not rupture the vessel. The tritium gas concentration in the vessel V should, of course, be sufficiently great that the quantity of tritium gas escaping from the smallest leak which it is desired to detect will be adequate to actuate the radiation detector used.

The outlet 12 of the pump 10 is connected through a flexible tubing 14 to the inlet 15 of a cold trap 16 which is immersed in a refrigerant 17 contained in a Dewar flask 18. The outlet 19 of the cold trap 16 is connected through a flexible tubing 20 to the inlet 21 of a canal or passage 22 located in the heat transfer rod 23 of a diffusion cloud chamber of the type shown in my copending application Serial No. 724,743. The passage 22 terminates at a point 24 which is spaced slightly below the zone of sensitivity of the cloud chamber. With an interval of time delay depending in part on the rate the pump 10 takes to fill the volume included between the point 24 and the rim 25 of the rod 23, tritium gas being delivered through the tubing 20 and the canal 22 will become observable in the sensitive zone immediately above the rim 25. The time required to fill this space can be lessened by decreasing the distance between points 24 and 25, and also by increasing the rate of delivery of the pump. A compromise must be made, however, avoiding too rapid pumping because of the disturbance which the pumping will cause in the diffusion cloud member. Generally, the displacement of the atmosphere in the cloud chamber in an interval of about 30 seconds or perhaps a minute will be satisfactory. To lessen other delay factors and make the observation through the detecting system particularly prompt, the flexible tubes 14 and 20 and the output and input connections 11, 12, 15, 19 and 21, and the cold trap 16 should all be made very small and the tubing connections should be made as short as possible. Additionally, the pump 10 should have the least possible waste volume.

The diffusion cloud chamber, a portion of which is shown in FIG. 1, is shown in greater detail in FIG. 3. This cloud chamber is the same as the one shown in my aforementioned copending patent application Serial No. 724,743 with the exception of the tube 20 and the canal 22 by means of which the atmosphere to be tested for tritium gas is admitted to the chamber. The cloud chamber of FIG. 3 comprises a vacuum flask 26 whose open end is provided with a stopper 27 through which passes the tube 20. One end of a Dewar vacuum element 28 is inserted in the stopper 27 and is separated from aluminum rod 23 by a cork washer 29. One end of the rod 23 extends into the flask 26, which contains a suitable refrigerant mixture such as freon and Dry Ice. The other end of the rod 23 is provided with a cavity 30 which may be lined with black paper 31.

The remote end of the Dewar vacuum element 28 is provided with an internally threaded bushing 32 which may be made from aluminum, into which is threaded an aluminum optical tube 33 having a lens 34. The tube 33 is lined with a material 35 such as filter paper which is wet with methanol or other suitable vapor forming liquid.

The optical tube 33, which may be screwed in or out for focusing purposes, has its lower end maintained at about room temperature through its thermally conductive wall so that the adjacent end of chamber 36 is maintained at about room temperature. The opposite end of chamber 36 is maintained at about the temperature of the refrigerant so as to produce the desired temperature gradient across the chamber 36. When a beam of light is passed through the walls of the Dewar flask 28 and the chamber 36, radioactive particles in the chamber 36 will cause their characteristic tracks, which may be viewed or photographed through the lens 34. In operation the refrigerant in the cold trap 16 of FIG. 1 is made to have a temperature not higher than the temperature of the refrigerant in the flask 26. This requirement arises for the reason that otherwise frost will condense in the canal 22, extending through the rod 23. Such frost, if permitted to accumulate, will clog the canal 22 and prevent the operation of the system. The maintenance of the temperature, in the manner herein set out, prevents the accumulation of such frost entirely.

Figure 2A:
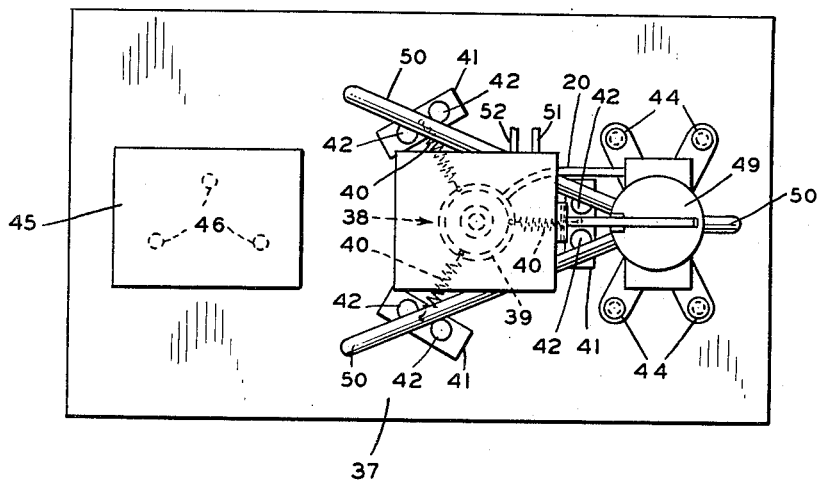
FIG. 2A is a plan view of the system of FIG. 2.
Figure 2:
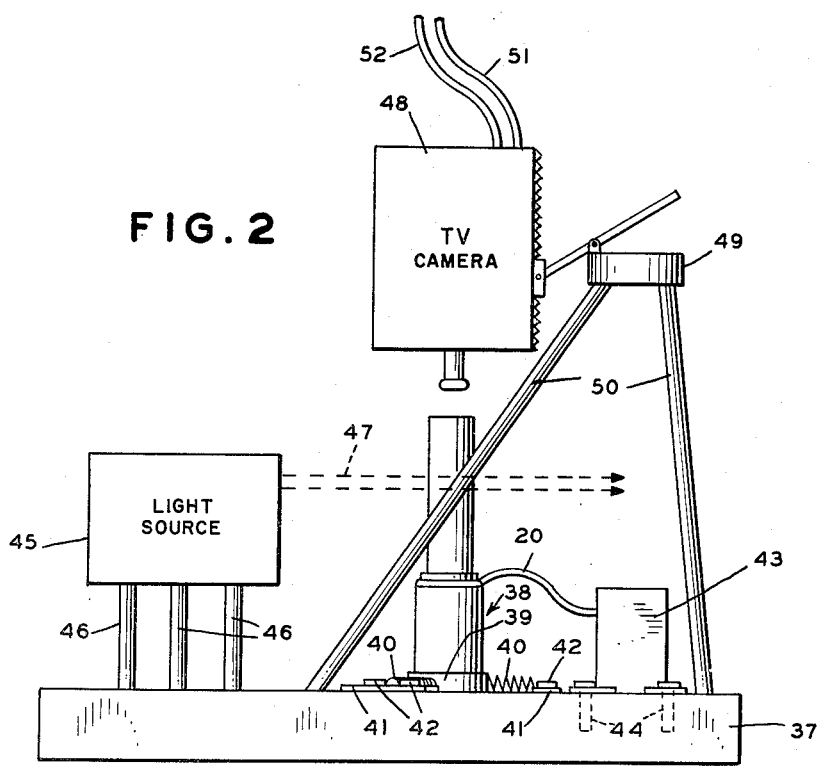
FIG. 2 is an elevational view, largely diagrammatic, of a leakage detection system in accordance with the invention and employing a closed circuit television camera for viewing the test results in a diffusion cloud chamber.

Turning now to FIGS. 2 and 2A, there is provided a base 37, which might be a convenient table top or other flat surface. Diffusion cloud chamber 38, which may be of the same type shown in FIG. 3, is mounted on the base 37 by means of a collar 39 affixed to the base 37 through springs 40, plates 41 and screws 42, affording a structure which will readily accommodate cloud chambers of various sizes. A housing 43, which is affixed to the base 37 by screws 44, contains the pump 10 and the cold trap 16 of Fig. 1, the tube 20 being shown in FIG. 2.

A light source 45 is mounted on the base 37 by legs 46 and directs a beam of light 47 through the chamber 36 of the cloud chamber 38. A television camera 48 is mounted on a platform 49 supported by tripod legs 50 and is arranged to pick up the tracks in the cloud chamber and supply an image thereof to a television monitor (not shown) through coaxial cable 51. Camera power is supplied through wire 52. A motion picture camera could be used in place of the television camera, if desired.

Figure 4:
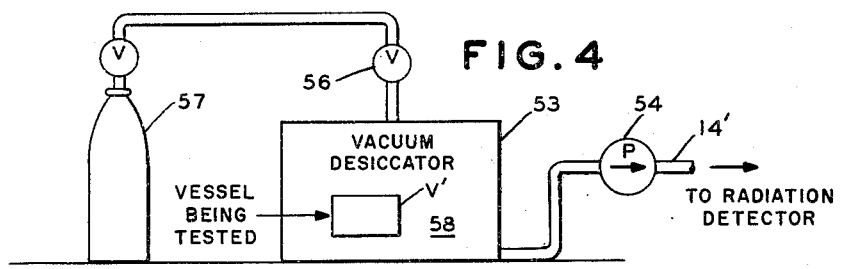
FIG. 4 is a block diagram illustrating a gas receptor system for use in accordance with the invention.

Referring now to FIG. 4, there is shown a system adapted to determine whether or not there is a substantial leak anywhere on a vessel V' adapted to be entirely enclosed in the test apparatus, and of such a nature that its entire exterior can be placed at a very low pressure without harm. The vessel, diagrammatically illustrated at V', is enclosed in a vacuum desiccator of classical design, designated diagrammatically by numeral 53. The vacuum desiccator 53 is continually exhausted by a pump designated in FIG. 4 by reference figure numeral 54. The pump 54 connects to the desiccator 53 by a flexible tubing 55. The output of the pump delivers to a flexible tubing 14', corresponding to the tubing 14 of FIG. 1, and the effluent so delivered continues in the manner indicated in FIG. 1. Into the space of the vacuum desiccator a slow leak of gas such as nitrogen or argon occurs through a throttle 56 from a pressure source 57. The vessel V' to be tested is initially filled to a suitable pressure, e.g., atmospheric pressure, with an atmosphere containing tritium and another gas such as nitrogen. Gas escaping into the more or less completely evacuated space 58 inside the vacuum desiccator 53 is contaminated by a leakage gas from the vessel V' before being withdrawn by the vacuum pump 54, assuming that there is any leakage. Leakage, if any, thus causes tritium contaminated gas to be delivered through the pneumatic system shown in FIG. 1, whereupon tritium desintegrations are observed by the optical system shown in FIG. 2, if there is leakage. On the other hand, if the vessel V' has no leaks, no tritium contamination will escape from its interior into the evacuated space; hence no tritium will be pumped with the gas received in the vacuum pump 54 from this space 58. Accordingly, no tritium will be observed as being delivered into the canal 22. The observation of no tritium disintegrations in the optical system shown in FIG. 2 will, in such a case, lead to a conclusion that there is no leakage of the vessel V'. Direct visual observation can, of course, be used instead of the system of FIG. 2.

Tritium disintegrations can also be observed with other detecting apparatus, a particularly desirable device being the Geiger counter system shown in my copending patent application Serial No. 545,335. For certain purposes there is advantage in the cloud chamber system over the Geiger counter. This is especially true when the detecting of tritium must be conducted in the presence of high background radiation. Unfortunately, high background radiation will produce a considerable population of low energy events due to ionizing paths that originate very near the cathode of the Geiger counter. Such events, due to high background, can be eliminated in the cloud chamber observation by ignoring all tracks in the close vicinity of the walls. Also, the cloud chamber, being less sensitive and hard to overload, can be used at higher levels of intensity of tritium. Although this latter differentiation between the cloud chamber technique and the Geiger counter technique does favor better observations in the presence of high background, in another sense it represents an advantage for the Geiger counter system, which is inherently capable of great sensitivity to tritium in a patient, slow observation. Generally, the diffusion cloud chamber will be used for rapid cursory detection of substantial leaks, and the counter system will be used for the most stringent observation of tightness in an overall sense, where a long slow observation is permitted. Particularly, the Geiger counter system will be of advantage in connection with a receptor of leakage testing material such as is shown in FIG. 4. In using a Geiger counter detection method, for example in an arrangement as shown in FIG. 4, it should be understood that a suitable quenching agent such as alcohol vapor may be added to the argon carrier before delivery of the argon to the interior space of the Geiger counter tube.

While the invention has been described in connection with specific examples thereof and in specific uses, various modifications thereof will occur to those skilled in the art without departing from the spirit and scope of the invention as set forth in the appended claims.

What is claimed is:

1. Apparatus for detecting leakages in a closed vessel containing an appreciable quantity of tritium gas at a pressure substantially in excess of the pressure in the space surrounding said vessel, comprising a pump, means interconnecting the inlet of said pump and said space surrounding said vessel, a detecting device for detecting low energy nuclear radiations from a gaseous sample, and means interconnecting the outlet of said pump and said detecting device whereby tritium gas leaking from said vessel will be delivered to said detecting device.

2. Apparatus as set forth in claim 1 in which said detecting device is a tritium gas-sensitive Geiger counter.

3. Apparatus as set forth in claim 1 in which said detecting device is a diffusion cloud chamber.

4. Apparatus for detecting leakages in a closed vessel containing an appreciable quantity of tritium gas at a super-atmospheric pressure, comprising a pump, means including a flexible tube and a nozzle interconnecting the inlet of said pump and the space surrounding said vessel, a detecting device for detecting low energy nuclear radiations from a gaseous sample, and means interconnecting the outlet of said pump and said detecting device whereby tritium gas leaking from said vessel will be delivered to said detecting device.

5. Apparatus for detecting leakages in a closed vessel containing an appreciable quantity of tritium gas, comprising a substantially air-tight chamber surrounding said vessel, a vacuum pump, means interconnecting the inlet of said pump and said chamber, a detecting device for detecting low energy nuclear radiations from a gaseous sample, and means interconnecting the outlet of said pump and said detecting device wherey tritium gas leaking from said vessel into said chamber will be delivered to said detecting device.

6. Apparatus as set forth in claim 5 in which said detecting device is a diffusion cloud chamber having a cold source and in which said means interconnecting the outlet of said pump and said detecting device includes a cold trap have a temperature not lower than the temperature of said cold source.

References Cited in the file of this patent

UNITED STATES PATENTS

| 2,418,523 | Neddermeyer et al. | Apr. 8, 1947 |
| 2,518,327 | Jahn | Aug. 8, 1950 |
| 2,755,391 | Keyes | July 17, 1956 |
| 2,844,735 | Crentz et al. | July 22, 1958 |

OTHER REFERENCES

Linder: Abstract of application Serial No. 90,331, published Feb. 27, 1951, 643 O.G. 1333.

Biological Applications of Tritium by Thompson, Nucleonics, vol. 12, No. 9, September 1954, pages 31 to 35.